(12) United States Patent
Isaacson

(10) Patent No.: US 7,686,491 B1
(45) Date of Patent: Mar. 30, 2010

(54) ACTIVELY POINT-LIGHTED, DECORATIVE PANEL

(76) Inventor: Chris Isaacson, 3651/2 Ocean View Ave., Encinitas, CA (US) 92024

(*) Notice: Subject to any disclaimer, the term of this patent is extended or adjusted under 35 U.S.C. 154(b) by 469 days.

(21) Appl. No.: 11/456,083

(22) Filed: Jul. 6, 2006

(51) Int. Cl.
*A63J 17/00* (2006.01)

(52) U.S. Cl. .................. 362/565; 362/552; 362/554; 362/576; 362/581

(58) Field of Classification Search .......... 362/552, 362/554, 565, 576, 581; 385/117
See application file for complete search history.

(56) References Cited

U.S. PATENT DOCUMENTS 6,198,872 B1* 3/2001 Lipson et al. ............ 385/117
7,121,702 B2* 10/2006 Muller .................... 362/511

\* cited by examiner

*Primary Examiner*—Sandra L O'Shea
*Assistant Examiner*—Meghan K Dunwiddie
(74) *Attorney, Agent, or Firm*—Robroy R. Fawcett, Esq.

(57) ABSTRACT

Modular panels can be attached to a substratum, e.g. a wall or ceiling, to display an actively lighted star field. Each panel displays a respective subarea of the star field, the panels being attached onto the substratum in edgewise juxtaposed relationship according to the star field. Each panel defines a set of apertures extending through the panel and distributed over the panel according to the panel's respective subarea. On a back face of each panel is a set of light pipes respectively corresponding to the panel's set of apertures, each light pipe being illuminated by a light emitting diode. Panels can include twinkling stars, constant stars, and/or shooting stars, and energization of the corresponding light emitting diodes is constant or varied accordingly.

21 Claims, 6 Drawing Sheets

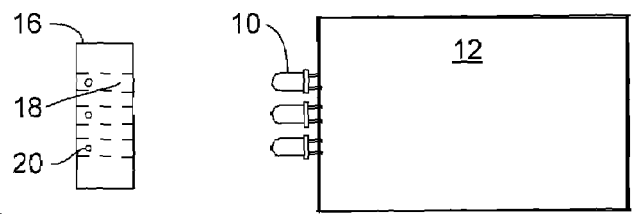
FIG. 4
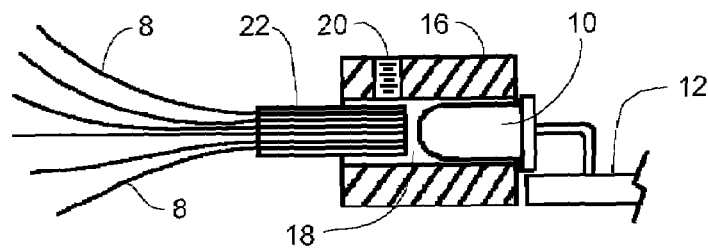
FIG. 3
FIG. 5
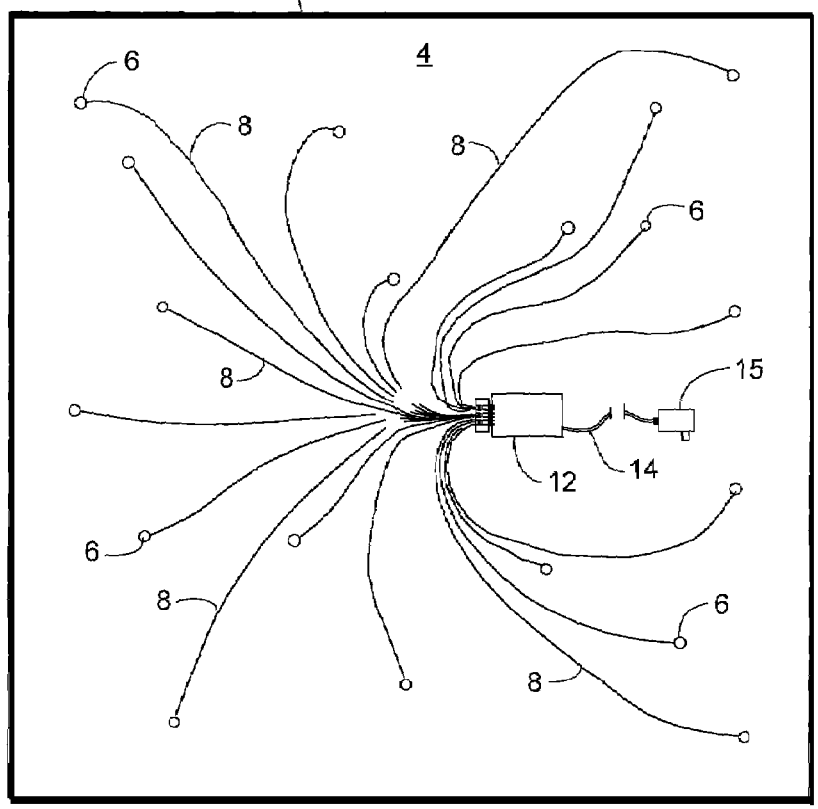
FIG. 1
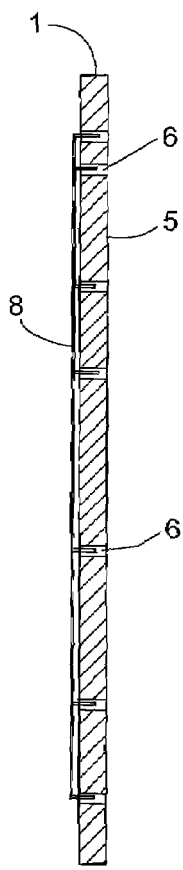
FIG. 2

ACTIVELY POINT-LIGHTED, DECORATIVE PANEL

BACKGROUND OF THE INVENTION

This invention relates in general to sets of actively lighted, modular flat panels attachable to a substratum, e.g. wall or ceiling, for presenting a selected constellation of light points depicting, for example, star fields and/or shooting stars—multiple panels being juxtaposable edgewise to create an planetarium-like star light presentation.

A user of this invention can mount one or more panels juxtaposed edgewise onto a generally planar substratum such as a wall or ceiling into an assemblage of one or more star constellations that may include one or more shooting star patterns. By doing so, the user can achieve a large actively lighted star display similar to a planetarium. The point lights may be modulated so as twinkle like distant stars, or be non-modulated to represent close stars and planets in our solar system, or be sequentially lighted to represent a shooting star. Furthermore, the panels run on low voltage DC so they can be energized by a "wall wart" type of power supply or from a battery, so no special wiring is required. Also, multiple panels can be powered in parallel by a single wall wart depending on panel power requirements and wall wart power capacity.

Other advantages and attributes of this invention will be readily discernable upon a reading of the text hereinafter.

SUMMARY OF THE INVENTION

An aspect of this invention is to provide actively lighted, decorative, modular panels attachable to walls or ceilings for pleasing presentation of light point constellations.

A further aspect of this invention is to provide a plurality of modular panels that each include one or more modulated and/or non-modulated points of light distributed over a face of the panel, various panels having various patterns.

A further aspect of this invention is to provide a plurality of modular panels that may include a shooting star pattern across one or more panels.

A further aspect of this invention is to provide a plurality of modular panels that include sets of modulated and/or non-modulated points of light distributed over a face of each panel and a shooting star pattern.

A further aspect of this invention is to provide a plurality of modular panels that include modulated, non-modulated, and/or sequential points of light distributed over the faces of the panels for assemblage of the panels into a display of complex point light patterns, such as actual star field constellations or imaginary star field constellations, each panel depicting a respective subarea of a constellation, the panels being juxtaposable edgewise onto a substratum to create an planetarium-like presentation.

These aspects, and others expressed or implied in this document, are accomplished by a modular system for assembling an actively lighted star field display on a display substratum comprising: a plurality of panels each including a front face and a back face, each panel for displaying a respective subarea of the star field, the panels being back face attachable onto the display substratum in edgewise juxtaposed relationship according to the star field; each panel defining a set of apertures extending through the panel, the apertures being distributed over said each panel according to said each panel's respective subarea; on a back face of each panel a set of light pipes respectively corresponding to the set of apertures, each light pipe including an input and an output, the output of said each light pipe being disposed at least partially in its corresponding aperture; a power source for each panel. The plurality of panels can include a first set of panels whose respective subareas each include one or more twinkling stars, each first set panel further comprising a modulated light source connected to the power source for inputting light into light pipe or pipes corresponding to said one or more twinkling stars. The plurality of panels can further include a second set of panels whose respective subareas each include one or more constant stars, each second set panel further comprising a constant light source connected to the power source for inputting light into light pipe or pipes corresponding to said one or more constant stars. The plurality of panels can further include a third set of panels whose respective subareas each include a shooting star or a segment of a shooting star, each third set panel further comprising a sequential light source connected to the power source for sequentially inputting light into light pipes corresponding to said shooting star or shooting star segment. Preferably the third set of panels (shooting star) includes an originating panel and a cascaded panel, as defined below. Preferably an originating panel further comprises: a controller that executes a pre-stored program, an output of the controller comprising M parallel digital data signals; M accumulators each receiving a respective data signal from the controller, each accumulator accumulating an electrical charge whenever its respective data signal is true and discharging whenever its respective data signal is false; and M amplifiers each for sensing an electrical charge in its respective accumulator and energizing a respective LED according to the electrical charge, said respective LED illuminating a respective plurality of shooting star light pipes when energized; the program causing the controller, from time to time, to sequentially pulse true each of the M data signals to give the effect of a fast traveling point of light; the discharge time of the accumulators being suitably longer than their charge time to add a visually discernible tapering-off tail to the traveling point of light. For a cascaded panel the controller of the originating panel outputs a shift clock, a latch signal and a serial data signal that is made true for a time by the program to continue a shooting star sequence in the cascaded panel, and the cascaded panel further comprises: an N-bit serial to parallel shift register responsive to the shift clock and operative to shift the true serial data signal through the register, one shift per shift clock; an N-bit latch register having data inputs in respective communication with the parallel data outputs of the shift register, the latch register responsive to the latch signal and operative to store therein the state of its data inputs, a latch signal following in time each shift clock; N accumulators each receiving a respective data output signal from the latch register, each accumulator accumulating an electrical charge whenever its respective data output signal is true and discharging whenever its respective data output signal is false; and N amplifiers each for sensing an electrical charge in its respective accumulator and energizing a respective LED according to the electrical charge, said respective LED illuminating a respective plurality of shooting star light pipes when energized; the shifting and latching of the true serial data signal through the registers sequentially pulsing true the data output signals from the latch register to give the effect of a fast traveling point of light; the discharge time of the accumulators being suitably long to add a visually discernible tapering-off tail to the traveling point of light.

As used herein and in the claims, a "set" contains one or more elements, and each panel can belong to one, two or three sets of panels depending on the panel's star field subarea. For example, if the subarea contains constant stars then the panel is a member of a set of constant star panels, if the subarea also contains twinkling stars then the panel also belongs to a set of twinkling star panels, if the subarea also includes a shooting star or a segment thereof then the panel also belongs to a set of shooting star panels.

BRIEF DESCRIPTION OF THE DRAWINGS

FIG. 1 is a backside plan view of a panel according to this invention.

FIG. 2 is a edge-wise cross-sectional view of a panel according to this invention.

FIG. 3 is a top plan view of a circuit board for energizing and modulating points of light according to this invention.

FIG. 4 is a top plan view of a light coupling block according to this invention.

FIG. 5 is a cross-sectional view of a light tunnel defined by a light coupling block with a collared fiber optic bundle inserted in one end of the tunnel and an LED inserted into the opposite end of the tunnel.

DESCRIPTION OF THE PREFERRED EMBODIMENT

Figure 6:
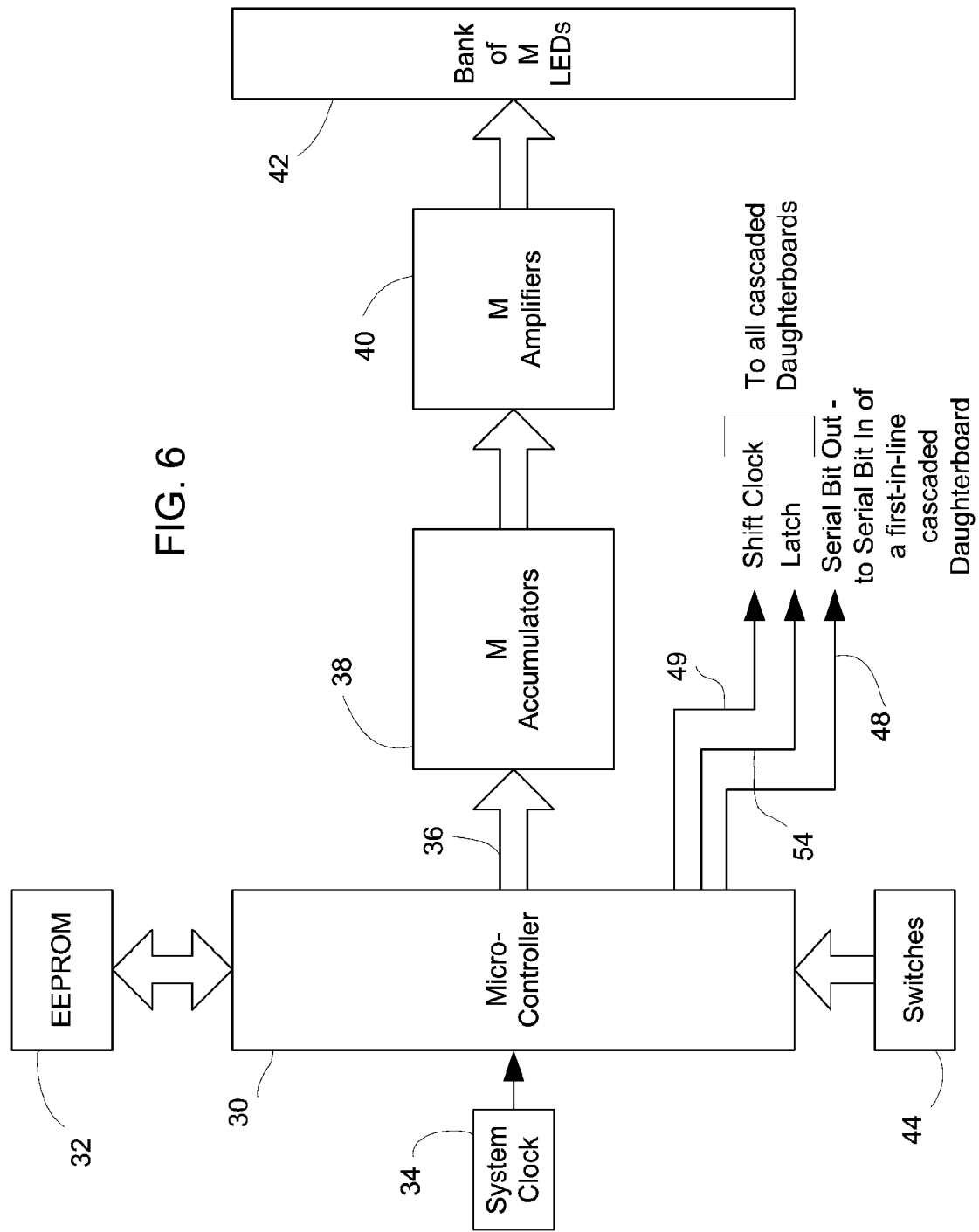
FIG. 6 is a block diagram of a preferred embodiment of a shooting star energization circuit according to this invention.

Referring to FIGS. 1-3, a preferred flat panel 1 according to this invention is illustrated to include a plurality of through-holes 6 distributed over the panel in a desired pattern, e.g. a pattern comprising a star constellation or some portion of a constellation or random star pattern. Also illustrated, on a backside 4, are a plurality of fiber optic cables 8, and protruding into each through-hole 6 and facing out from a front 5 of the panel is a light output end of a respective fiber optic cable. The fiber optic cables are each a light pipe that guides light from its input end to its output end protruding into its respective through-hole 6 such that the light emanating from the optic cables can be seen from the front 5 of the panel. Preferably the through-holes are just large enough to accommodate a single fiber optic cable. The light input ends of the optic cables each squarely face a light emitting diode 10 that sources the light for the cable. Preferably there are a plurality of LEDs and each LED provides light for one or more optic cables. As an example, in FIG. 1, there are nineteen optic cables illustrated and three LEDs sourcing light to the cables. The LEDs are energized by respective modulating circuits (FIG. 7) and non-modulating circuits (FIG. 8) preferably residing on a printed circuit board 12. The LEDs are connected to the circuit board for mechanical support, and they project from an edge of the board such that the long axes of the LEDs are parallel to the plane of the circuit board to minimize the edge-wise profile of the assembly. The circuit preferably receives power via a cable 14 that mates individually or in parallel (with one or more circuits on other panels) with a low voltage power source such as a battery or conventional inexpensive line voltage adapter 15 commonly called a "wall wart" typically having a step-down transformer and a rectifier to output a DC (direct current) voltage at an appropriate level and power capacity.

Referring to FIGS. 1-5, the light input ends of the optic cables are preferably grouped in bunches of one or more depending on which LED 10 is to source the light. Preferably energization and modulation of energization of the LEDs are controlled by respective circuits. Light is injected into any given optic fiber 8 by facing an input end of the fiber toward the front of an LED that matches the desired modulation or non-modulation for the point of light (e.g. the star) that the given fiber delivers to the front 5 of the panel. Thus, depending on the desired modulation or non-modulation of the respective points of light, the input ends of the optic fibers associated with those light points are disposed in front of an appropriate LED. This means that the grouping of optic fiber input ends is not necessarily uniform and depends on the desired display. In any case, the preferred means by which the fiber input ends are placed and held in front of their corresponding LEDs comprises a light coupling block 16 that defines a plurality of open-ended light tunnels 18. An LED is inserted into one end of a light tunnel to confine light emitted by the LED to the tunnel, and an optic fiber or a bundle of fibers 22 are inserted into the opposite end of the tunnel to receive light from the opposing LED. Each coupling block is adapted to mate with the projecting LEDs of a corresponding circuit board such that there is registration between the LEDs of the circuit board and light tunnels of the block. Optionally grouped input ends of multiple optic fibers can be bundled together by a collar 22. Preferably the collars are shrunken segments of heat-shrinkable tubing, but the collar can also be metal or any other type of collaring material. The collaring also assists in securing bundled fiber ends in their respective tunnels. Preferably each tunnel near the end into which an optic fiber or a fiber bundle is inserted defines an open, threaded bore 20 that intersects the tunnel. The threaded bore 20 is for a set screw 21 (FIG. 10) that can be screwed into the bore far enough to intrude into the tunnel and press against a fiber or bundle therein to secure it within the tunnel.

Optionally a binding adhesive can be injected into the bore 20 to secure a fiber or bundle of fibers therein.

Referring to FIG. 6, a block diagram of a preferred LED energization circuit for a "shooting star" display is illustrated. A shooting star display is so named because it visually simulates a shooting star. The circuit includes a microcontroller 30 that executes a program pre-stored in a memory 32 that is preferably a non-volatile memory such as an EEPROM (electronically erasable programmable read only memory). The timing of the execution is controlled by a system clock 34 external to the microcontroller. An output of the microcontroller comprises a plurality M of parallel digital data signals 36 that are communicated to respective M accumulators 38, and the outputs of the accumulators are communicated to respective M amplifiers 40. The outputs of the amplifiers are communicated to respective LEDs in a bank 42 of M LEDs. When a digital data signal from the microcontroller is true its respective accumulator stores an electrical charge that is currently amplified to energize a respective LED. After the digital data signal goes false, the accumulator discharges into the amplifier. Preferably the discharge time constant of the accumulator is suitably long to provide a lag time between when the digital signal goes false and the light output of the LED fades down sufficient to create a viewer noticeable fading tail effect. Optionally there are one or more switches 44 to provide manual entry information to the microcontroller to, for example, allow a user to choose how often the shooting star goes off. Preferably there can be four choices programmed in by means of the switches.

Figure 7:
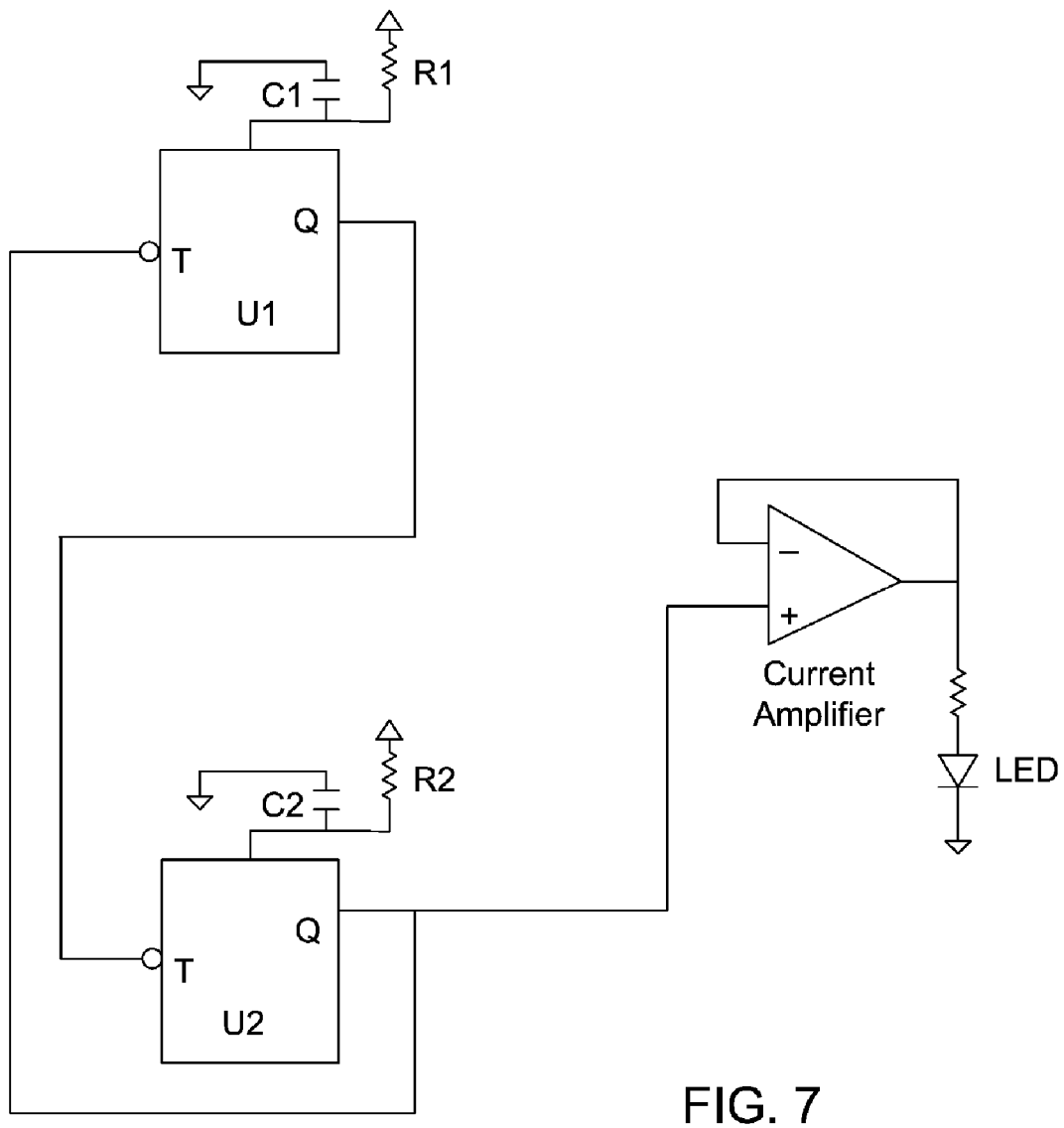
FIG. 7 is a block diagram of a preferred circuit for periodically modulating the energization of a lighting element, such as a light emitting diode (LED), for a twinkling effect, the circuit preferably being incorporated in a printed circuit board such as shown in FIG. 3.
Figure 8:
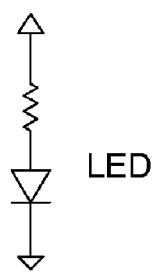
FIG. 8 is a preferred circuit for energizing a lighting element without modulation. also preferably incorporated in a circuit board such as shown in FIG. 3.

Referring to FIGS. 7 and 8, illustrated are energization circuits for light display patterns that are not part of a shooting star pattern. These display patterns comprise distributed pluralities of individually modulating and non-modulating points of light. FIG. 8 illustrates a preferred circuit for periodically modulating energization of an LED. The circuit includes two cross-coupled monostable multivibrators, U1 and U2. The false going output of one multivibrator triggers the other multivibrator in oscillatory fashion. The output of U2 feeds a current amplifier, and when Q of U2 is true, the LED is energized. The Q output of U2 is a periodic square wave, the duty cycle of which is dependent on the selected values of R1, C1, R2 and C2. Thus the twinkling effect of the LED of this circuit can be adjusted by purposeful selection of the aforesaid R and C values. The circuit of FIG. 8 is simply an LED in series with a current limiting resistor between a reference supply voltage and a reference ground, and so the LED is constantly energized whenever power is applied to the circuit.

Referring again to FIG. 6, a star field assemblage made from one or more of the panels can include a shooting star that periodically or non-periodically (random from time to time) fires-off. A panel with a shooting star pattern preferably includes a plurality of spaced apertures linearly or curvilinearly aligned and their corresponding light pipes 8 that are sequentially illuminated by their respective LEDs 42 that are sequentially energized by the microcontroller 30 to give the effect of a shooting star. In operation, the microcontroller sequentially pulse lights the LEDs 42 associated with the aligned fiber output ends to give the effect of a fast traveling point of light, and preferably the discharge time of the accumulators 38 is suitably greater than the charge time to add a visually discernible tapering-off tail to the traveling point of light that matches what an actual shooting star looks like. If the shooting star pattern only encompasses a single panel then the single panel need only include the circuit of FIG. 6 for the shooting star pattern, and the circuits of FIGS. 7 and/or 8 depending on the desired light point pattern not involved in the shooting star pattern.

Figure 11:
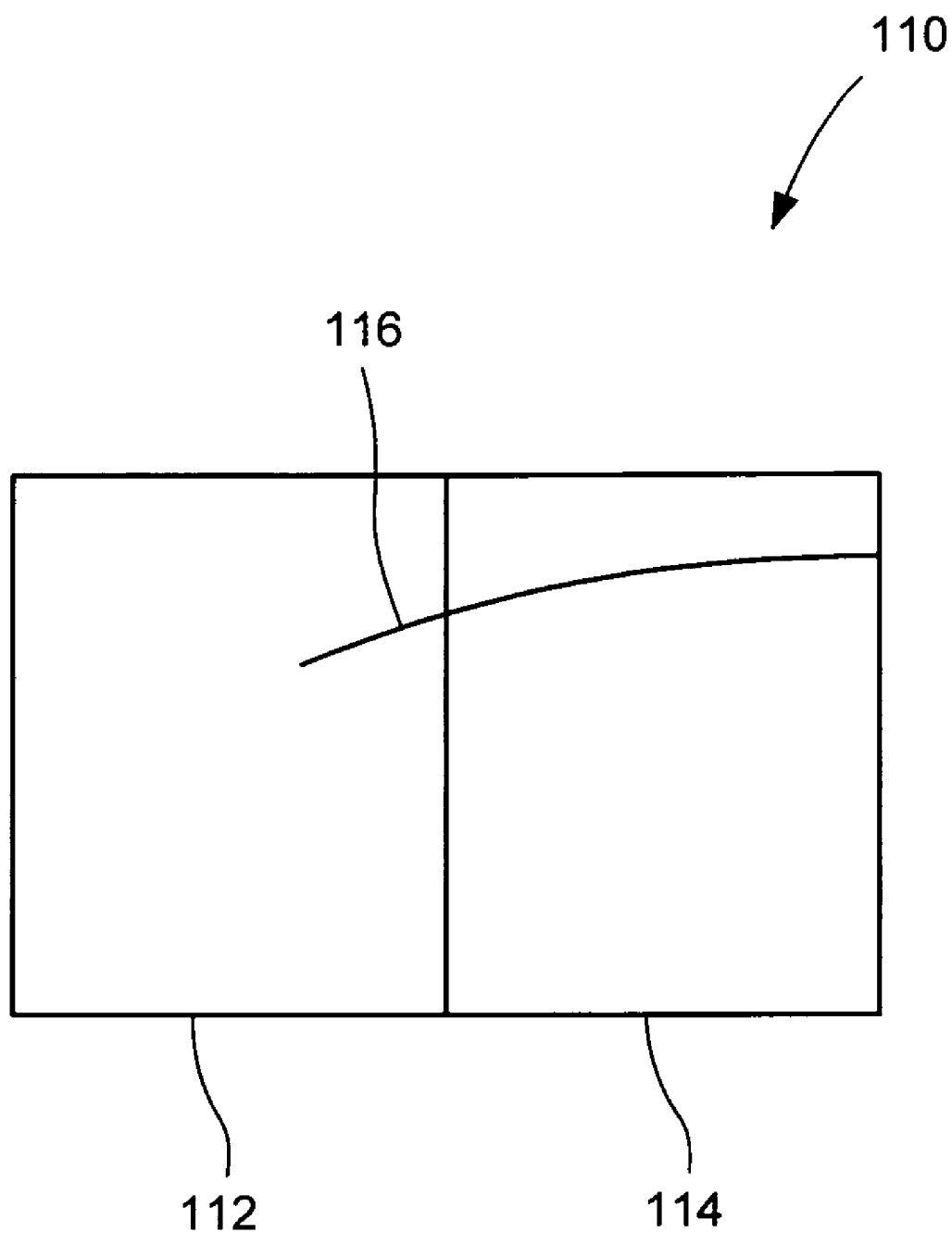
FIG. 11 is a block diagram of a plurality of panels having an originating panel and a cascaded panel whose respective subareas each include a segment of a shooting star.

Referring to FIG. 11, optionally an ordered set 110 of two or more of panels, 112 and 114, can be tailored to have a shooting star pattern 116 extend across the set. The overall pattern of the shooting star across the ordered set can be linear or curvilinear to closely simulate an actual shooting star. For such an ordered set, each panel includes a segment of the shooting star pattern. An originating panel 112 includes the first or originating segment of the shooting star pattern, and the other cascaded panels 114 of the set include in order cascading segments of the pattern. During affixation of the set onto a substratum, each panel is disposed to align its shooting star segment with the segment of the immediately preceding in order panel's segment. In multi-panel shooting star displays, the originating panel has a mother circuit, preferably as in FIG. 6 explained above, and the other panels each have a daughter circuit, preferably as in FIG. 9 explained below, serially linked in order, i.e., cascaded, to the mother circuit in a serial chain.

Figure 9:
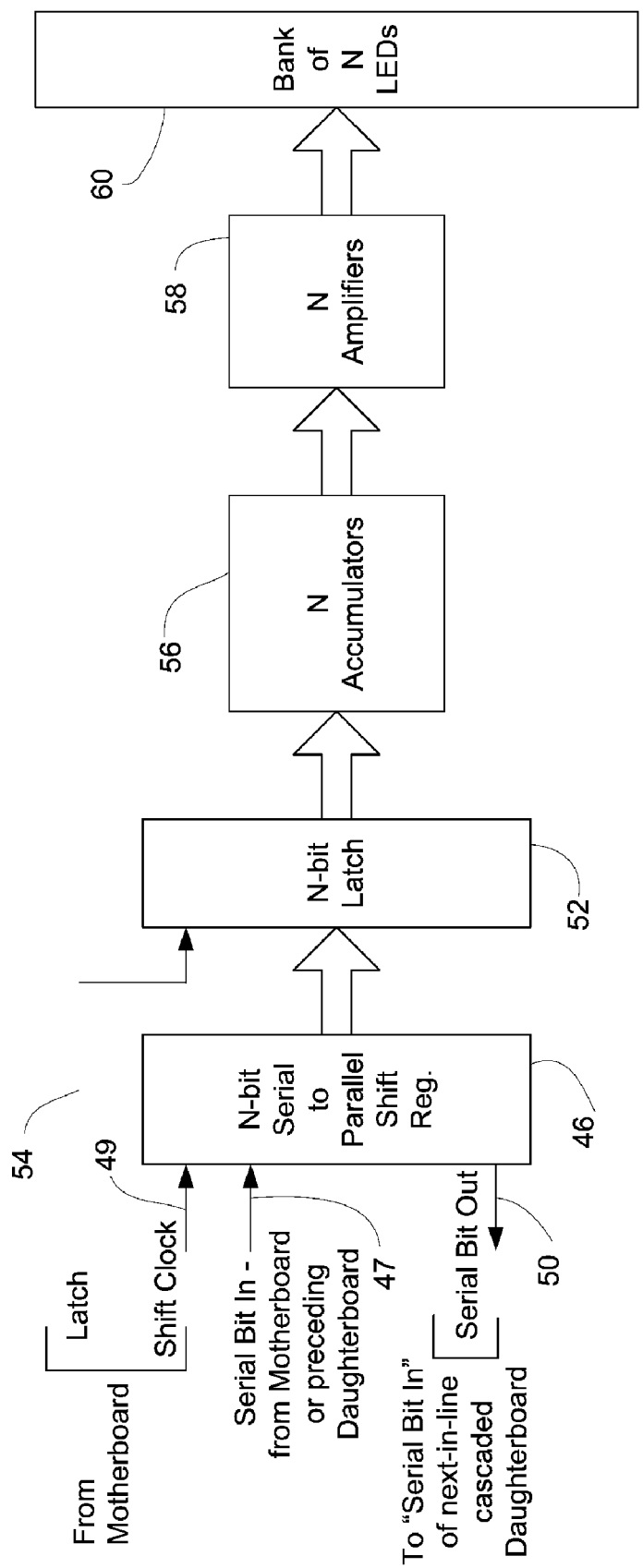
FIG. 9, is a block diagram of a circuit for cascading energization of an additional bank of lighting elements to the shooting star circuit of FIG. 6.

Referring to FIG. 9, a preferred daughter circuit incorporated onto the back face of cascadable panels is illustrated to include an N-bit serial to parallel shift register 46 having an input for a shift clock 49. The shift clock is communicated from the mother circuit (FIG. 6) to in parallel to all daughter circuits to prompt the shift registers to shift. The shift register also has a serial data bit input 47 connected to either the serial bit output 48 from the mother circuit or to a serial bit output 50 from the shift register of an immediately preceding (in the chain) daughter circuit. This serial data bit input 47 is presented true for a time by a preceding-in-line circuit (mother or daughter) whenever a shooting star sequence is to be continued in a next-in-line daughter circuit. In this way the serial inputs and the serial outputs of the mother circuit and all cascaded daughter circuits are daisy chained—the serial output from one circuit being communicated to the serial input of the next-in-line circuit, if any, to fire the next-in-line shooting star segment. As used herein the term "fire" means to sequentially pulse each LED in a next-in-line circuit as a part of a shooting star display.

The parallel data output of the N-bit shift register 46 is communicated to respective data inputs of an N-bit latch register 52. The latch register also has a input for receiving a latch signal 54. The latch signal 54 is communicated from the mother circuit to all daughter circuits in parallel to prompt each latch register to store and output the data from its respective shift register. The latch signal following in time each shift clock. The N data signals from the latch register are communicated to respective N accumulators 56, and the outputs from the accumulators are communicated to respective N amplifiers 58. The outputs of the amplifiers are communicated to respective LEDs in a bank 60 of N LEDs. When a digital data signal from the latch register is true its respective accumulator stores an electrical charge that is current amplified to energize a respective LED. After the digital data signal goes false, the accumulator discharges into the amplifier. Preferably the discharge time constant of the accumulator is suitably long to provide a viewer noticeable lag time between when the digital signal goes false and the light output of the LED fades down.

Referring to FIGS. 6 and 9, in operation, the originating panel's LEDs are periodically or randomly fired, i.e., energized sequentially by the mother circuit (FIG. 6) incorporated onto the back of the originating panel; the microcontroller 30 does this by outputting data to the accumulators 38 that effectively shifts a single true bit through its bank of M LEDs 42. For any daughter circuits (FIG. 9) connected to the mother circuit in a cascading chain, the process of periodically shifting the single true bit is continued beyond the mother circuit and through the chain of serially connected shift registers 46 by means of the shift clock 49 and the latch signal 54 both sent in parallel to all cascaded daughter circuits, and the daisy chained serial true bit. In this way the LEDs 60 of the panels cascaded to the originating panel are subsequently fired sequentially in panel order. The signals sent by the mother circuit to the cascaded daughter circuits control the order and sequence of LED firing on the cascading panels. In this manner a shooting star display can traverse multiple panels using only three signal line interconnections between the panels.

Alternatively, the daughter circuits could be identical to the mother circuit in which case a single daisy chained signal, originating from the mother circuit, could be used to communicate from one circuit to the next-in-line circuit when to fire the latter's LEDs, i.e., sequentially pulse each LED in the next-in-line circuit as a part of a shooting star display.

Figure 10:
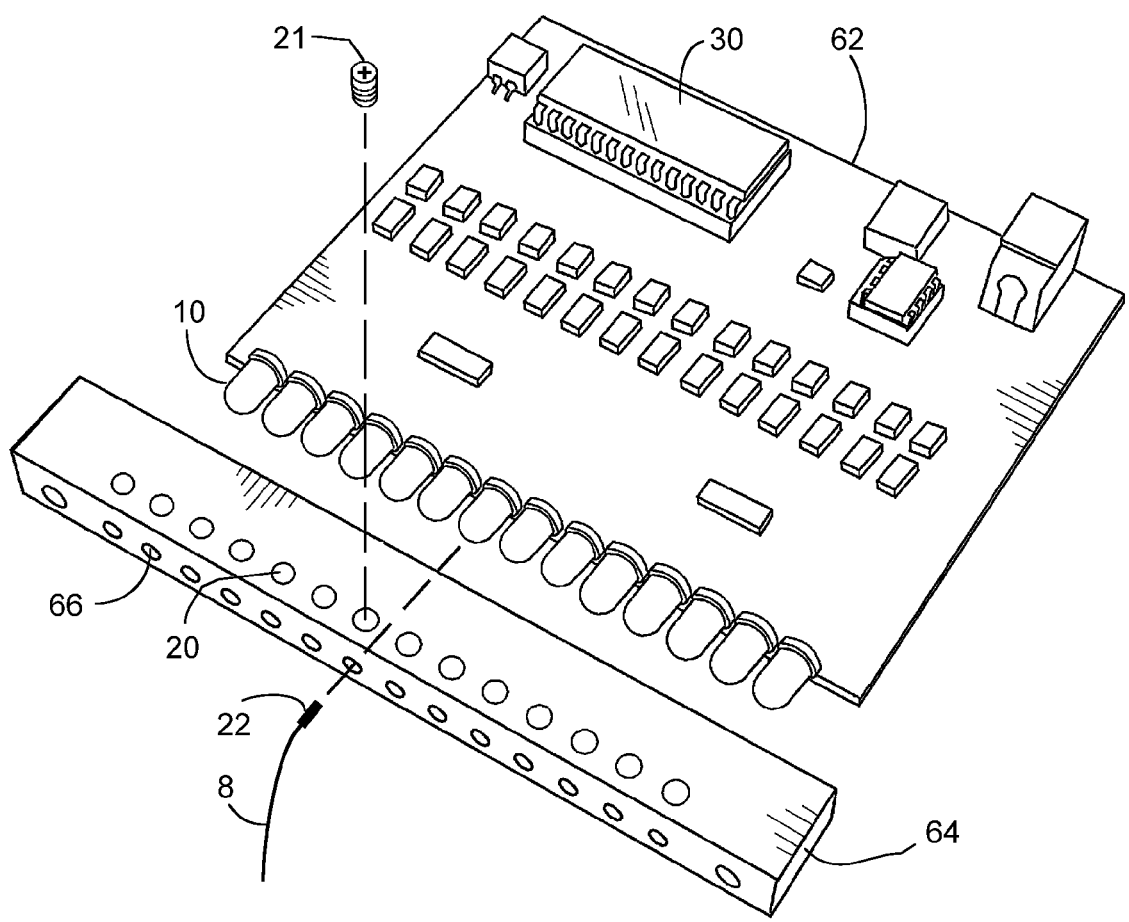
FIG. 10 is an exploded pictorial view of a printed circuit board incorporating the circuit of FIG. 9 and a light coupling block.

Referring to FIG. 10, a printed circuit board 62 containing a mother circuit (FIG. 6) is illustrated to include a bank of fourteen LEDs 10 selectively energizable by a microcontroller 30 via accumulators and amplifiers. Also illustrated is a light coupling block 64 having fourteen light tunnels 66 for light coupling the fourteen LEDs to fourteen optic fibers 8, each fiber preferably secured in the tunnel by means of a clamping screw 21. The daughter boards are preferably of similar construction, the primary difference being that the microcontroller is replaced by the shift and latch registers.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A modular system for assembling an actively lighted star field display on a display substratum comprising:
   a plurality of panels each including a front face and a back face, each panel for displaying a respective subarea of the star field, the panels being back face attachable onto the display substratum in edgewise juxtaposed relationship according to the star field;
   each panel defining a set of apertures extending through the panel, the apertures being distributed over said each panel according to said each panel's respective subarea;
   on a back face of each panel a set of light pipes respectively corresponding to the set of apertures, each light pipe including an input and an output, the output of said each light pipe being disposed at least partially in its corresponding aperture;
   a power source for each panel; and
   wherein the plurality of panels includes a first set of panels whose respective subareas each include one or more twinkling stars, each first set panel further comprising a modulated light source connected to the power source for inputting light into light pipe or pipes corresponding to said one or more twinkling stars; and
   wherein the plurality of panels includes a second set of panels having an originating panel and a cascaded panel whose respective subareas each include a shooting star or a segment of a shooting star, each second set panel further comprising a sequential light source connected to the power source for sequentially inputting light into light pipes corresponding to said shooting star or shooting star segment.

2. The modular system according to claim 1 wherein the plurality of panels includes a third set of panels whose respective subareas each include one or more constant stars, each third set panel further comprising a constant light source connected to the power source for inputting light into light pipe or pipes corresponding to said one or more constant stars.

3. The modular system according to claim 1 wherein the originating panel further comprises:
   a controller that executes a pre-stored program, an output of the controller comprising M parallel digital data signals;
   M accumulators each receiving a respective data signal from the controller, each accumulator accumulating an electrical charge whenever its respective data signal is true and discharging whenever its respective data signal is false; and
   M amplifiers each for sensing an electrical charge in its respective accumulator and energizing a respective LED according to the electrical charge, said respective LED illuminating a respective shooting star light pipe when energized;
   the program causing the controller, from time to time, to sequentially pulse true each of the M data signals to give the effect of a fast traveling point of light;
   the discharge time of the accumulators being suitably long to add a visually discernible tapering-off tail to the traveling point of light.

4. The modular system according to claim 3 wherein the controller outputs a shift clock, a latch signal and a serial data signal that is made true for a time by the program to continue a shooting star sequence in the cascaded panel, and wherein the cascaded panel further comprises:
   an N-bit serial to parallel shift register responsive to the shift clock and operative to shift the true serial data signal through the register, one shift per shift clock;
   an N-bit latch register having data inputs in respective communication with the parallel data outputs of the shift register, the latch register responsive to the latch signal and operative to store therein the state of its data inputs, a latch signal following in time each shift clock;
   N accumulators each receiving a respective data output signal from the latch register, each accumulator accumulating an electrical charge whenever its respective data output signal is true and discharging whenever its respective data output signal is false; and
   N amplifiers each for sensing an electrical charge in its respective accumulator and energizing a respective LED according to the electrical charge, said respective LED illuminating a respective shooting star light pipe when energized;
   the shifting and latching of the true serial data signal through the registers sequentially pulsing true the data output signals from the latch register to give the effect of a fast traveling point of light;
   the discharge time of the accumulators being suitably long to add a visually discernible tapering-off tail to the traveling point of light.

5. A modular system for assembling an actively lighted star field display on a display substratum comprising:
   a plurality of panels each including a front face and a back face, each panel for displaying a respective subarea of the star field, the panels being back face attachable onto the display substratum in edgewise juxtaposed relationship according to the star field;
   each panel defining a set of apertures extending through the panel, the apertures being distributed over said each panel according to said each panel's respective subarea;
   on a back face of each panel a set of light pipes respectively corresponding to the set of apertures, each light pipe including an input and an output, the output of said each light pipe being disposed at least partially in its corresponding aperture;
   a power source for each panel; and
   wherein the plurality of panels includes a first set of panels whose respective subareas each include one or more constant stars, each first set panel further comprising a constant light source connected to the power source for inputting light into light pipe or pipes corresponding to said one or more constant stars; and
   wherein the plurality of panels includes a second set of panels having an originating panel and a cascaded panel whose respective subareas each include a shooting star or a segment of a shooting star, each second set panel further comprising a sequential light source connected to the power source for sequentially inputting light into light pipes corresponding to said shooting star or shooting star segment.

6. The modular system according to claim 5 wherein the originating panel further comprises:

a controller that executes a pre-stored program, an output of the controller comprising M parallel digital data signals;

M accumulators each receiving a respective data signal from the controller, each accumulator accumulating an electrical charge whenever its respective data signal is true and discharging whenever its respective data signal is false; and M amplifiers each for sensing an electrical charge in its respective accumulator and energizing a respective LED according to the electrical charge, said respective LED illuminating a respective shooting star light pipe when energized;

the program causing the controller, from time to time, to sequentially pulse true each of the M data signals to give the effect of a fast traveling point of light;

the discharge time of the accumulators being suitably long to add a visually discernible tapering-off tail to the traveling point of light.

7. The modular system according to claim 6 wherein the controller outputs a shift clock, a latch signal and a serial data signal that is made true for a time by the program to continue a shooting star sequence in the cascaded panel, and wherein the cascaded panel further comprises:

an N-bit serial to parallel shift register responsive to the shift clock and operative to shift the true serial data signal through the register, one shift per shift clock;

an N-bit latch register having data inputs in respective communication with the parallel data outputs of the shift register, the latch register responsive to the latch signal and operative to store therein the state of its data inputs, a latch signal following in time each shift clock;

N accumulators each receiving a respective data output signal from the latch register, each accumulator accumulating an electrical charge whenever its respective data output signal is true and discharging whenever its respective data output signal is false; and N amplifiers each for sensing an electrical charge in its respective accumulator and energizing a respective LED according to the electrical charge, said respective LED illuminating a respective shooting star light pipe when energized;

the shifting and latching of the true serial data signal through the registers sequentially pulsing true the data output signals from the latch register to give the effect of a fast traveling point of light;

the discharge time of the accumulators being suitably long to add a visually discernible tapering-off tail to the traveling point of light.

8. A modular system for assembling an actively lighted star field display on a display substratum comprising:

a plurality of panels each including a front face and a back face, each panel for displaying a respective subarea of the star field, the panels being back face attachable onto the display substratum in edgewise juxtaposed relationship according to the star field;

each panel defining a set of apertures extending through the panel, the apertures being distributed over said each panel according to said each panel's respective subarea;

on a back face of each panel a set of light pipes respectively corresponding to the set of apertures, each light pipe including an input and an output, the output of said each light pipe being disposed at least partially in its corresponding aperture;

a power source for each panel; and wherein the plurality of panels includes a set of panels having an originating panel and a cascaded panel whose respective subareas each include a shooting star or a segment of a shooting star, each of the set's panels further comprising a sequential light source connected to the power source for sequentially inputting light into light pipes corresponding to said shooting star or shooting star segment.

9. The modular system according to claim 8 wherein the originating panel further comprises:

a controller that executes a pre-stored program, an output of the controller comprising M parallel digital data signals;

M accumulators each receiving a respective data signal from the controller, each accumulator accumulating an electrical charge whenever its respective data signal is true and discharging whenever its respective data signal is false; and M amplifiers each for sensing an electrical charge in its respective accumulator and energizing a respective LED according to the electrical charge, said respective LED illuminating a respective shooting star light pipe when energized;

the program causing the controller, from time to time, to sequentially pulse true each of the M data signals to give the effect of a fast traveling point of light;

the discharge time of the accumulators being suitably long to add a visually discernible tapering-off tail to the traveling point of light.

10. The modular system according to claim 9 wherein the controller outputs a shift clock, a latch signal and a serial data signal that is made true for a time by the program to continue a shooting star sequence in the cascaded panel, and wherein the cascaded panel further comprises:

an N-bit serial to parallel shift register responsive to the shift clock and operative to shift the true serial data signal through the register, one shift per shift clock;

an N-bit latch register having data inputs in respective communication with the parallel data outputs of the shift register, the latch register responsive to the latch signal and operative to store therein the state of its data inputs, a latch signal following in time each shift clock;

N accumulators each receiving a respective data output signal from the latch register, each accumulator accumulating an electrical charge whenever its respective data output signal is true and discharging whenever its respective data output signal is false; and N amplifiers each for sensing an electrical charge in its respective accumulator and energizing a respective LED according to the electrical charge, said respective LED illuminating a respective shooting star light pipe when energized;

the shifting and latching of the true serial data signal through the registers sequentially pulsing true the data output signals from the latch register to give the effect of a fast traveling point of light;

the discharge time of the accumulators being suitably long to add a visually discernible tapering-off tail to the traveling point of light.

11. A star field display supported by a substratum comprising:

a plurality of edgewise juxtaposed panels each including a front face and a back face, the panels being back face affixed to the substratum, each panel displaying a respective subarea of the star field;

each panel defining a set of apertures extending through the panel, the apertures being distributed over said each panel according to said each panel's respective subarea;

on a back face of each panel a set of light pipes respectively corresponding to the set of apertures, each light pipe including an input and an output, the output of said each light pipe being disposed at least partially in its corresponding aperture;

a power source for each panel; and wherein the plurality of panels includes a first set of panels whose respective subareas each include one or more twinkling stars, each first set panel further comprising a modulated light source connected to the power source for inputting light into light pipe or pipes corresponding to said one or more twinkling stars; and wherein the plurality of panels includes a second set of panels having an originating panel and a cascaded panel whose respective subareas each include a shooting star or a segment of a shooting star, each second set panel further comprising a sequential light source connected to the power source for sequentially inputting light into light pipes corresponding to said shooting star or shooting star segment.

12. The star field display according to claim 11 wherein the plurality of panels includes a third set of panels whose respective subareas each include one or more constant stars, each third set panel further comprising a constant light source connected to the power source for inputting light into light pipe or pipes corresponding to said one or more constant stars.

13. The modular system according to claim 11 wherein the originating panel further comprises:
  a controller that executes a pre-stored program, an output of the controller comprising M parallel digital data signals;
  M accumulators each receiving a respective data signal from the controller, each accumulator accumulating an electrical charge whenever its respective data signal is true and discharging whenever its respective data signal is false; and
  M amplifiers each for sensing an electrical charge in its respective accumulator and energizing a respective LED according to the electrical charge, said respective LED illuminating a respective shooting star light pipe when energized;
  the program causing the controller, from time to time, to sequentially pulse true each of the M data signals to give the effect of a fast traveling point of light;
  the discharge time of the accumulators being suitably long to add a visually discernible tapering-off tail to the traveling point of light.

14. The modular system according to claim 13 wherein the controller outputs a shift clock, a latch signal and a serial data signal that is made true for a time by the program to continue a shooting star sequence in the cascaded panel, and wherein the cascaded panel further comprises:
  an N-bit serial to parallel shift register responsive to the shift clock and operative to shift the true serial data signal through the register, one shift per shift clock;
  an N-bit latch register having data inputs in respective communication with the parallel data outputs of the shift register, the latch register responsive to the latch signal and operative to store therein the state of its data inputs, a latch signal following in time each shift clock;
  N accumulators each receiving a respective data output signal from the latch register, each accumulator accumulating an electrical charge whenever its respective data output signal is true and discharging whenever its respective data output signal is false; and
  N amplifiers each for sensing an electrical charge in its respective accumulator and energizing a respective LED according to the electrical charge, said respective LED illuminating a respective shooting star light pipe when energized;
  the shifting and latching of the true serial data signal through the registers sequentially pulsing true the data output signals from the latch register to give the effect of a fast traveling point of light;
  the discharge time of the accumulators being suitably long to add a visually discernible tapering-off tail to the traveling point of light.

15. A star field display supported by a substratum comprising:
  a plurality of edgewise juxtaposed panels each including a front face and a back face, the panels being back face affixed to the substratum, each panel displaying a respective subarea of the star field;
  each panel defining a set of apertures extending through the panel, the apertures being distributed over said each panel according to said each panel's respective subarea;
  on a back face of each panel a set of light pipes respectively corresponding to the set of apertures, each light pipe including an input and an output, the output of said each light pipe being disposed at least partially in its corresponding aperture;
  a power source for each panel; and
  wherein the plurality of panels includes a first set of panels whose respective subareas each include one or more constant stars, each first set panel further comprising a constant light source connected to the power source for inputting light into the light pipe or pipes corresponding to said one or more constant stars; and
  wherein the plurality of panels includes a second set of panels having an originating panel and a cascaded panel whose respective subareas each include a shooting star or a segment of a shooting star, each second set panel further comprising a sequential light source connected to the power source for sequentially inputting light into light pipes corresponding to said shooting star or shooting star segment.

16. The modular system according to claim 15 wherein the originating panel further comprises:
  a controller that executes a pre-stored program, an output of the controller comprising M parallel digital data signals;
  M accumulators each receiving a respective data signal from the controller, each accumulator accumulating an electrical charge whenever its respective data signal is true and discharging whenever its respective data signal is false; and
  M amplifiers each for sensing an electrical charge in its respective accumulator and energizing a respective LED according to the electrical charge, said respective LED illuminating a respective shooting star light pipe when energized;
  the program causing the controller, from time to time, to sequentially pulse true each of the M data signals to give the effect of a fast traveling point of light;
  the discharge time of the accumulators being suitably long to add a visually discernible tapering-off tail to the traveling point of light.

17. The modular system according to claim 16 wherein the controller outputs a shift clock, a latch signal and a serial data signal that is made true for a time by the program to continue a shooting star sequence in the cascaded panel, and wherein the cascaded panel further comprises:

an N-bit serial to parallel shift register responsive to the shift clock and operative to shift the true serial data signal through the register, one shift per shift clock;

an N-bit latch register having data inputs in respective communication with the parallel data outputs of the shift register, the latch register responsive to the latch signal and operative to store therein the state of its data inputs, a latch signal following in time each shift clock;

N accumulators each receiving a respective data output signal from the latch register, each accumulator accumulating an electrical charge whenever its respective data output signal is true and discharging whenever its respective data output signal is false; and N amplifiers each for sensing an electrical charge in its respective accumulator and energizing a respective LED according to the electrical charge, said respective LED illuminating a respective shooting star light pipe when energized;

the shifting and latching of the true serial data signal through the registers sequentially pulsing true the data output signals from the latch register to give the effect of a fast traveling point of light;

the discharge time of the accumulators being suitably long to add a visually discernible tapering-off tail to the traveling point of light.

18. A star field display supported by a substratum comprising:

a plurality of edgewise juxtaposed panels each including a front face and a back face, the panels being back face affixed to the substratum, each panel displaying a respective subarea of the star field;

each panel defining a set of apertures extending through the panel, the apertures being distributed over said each panel according to said each panel's respective subarea;

on a back face of each panel a set of light pipes respectively corresponding to the set of apertures, each light pipe including an input and an output, the output of said each light pipe being disposed at least partially in its corresponding aperture;

a power source for each panel; and wherein the plurality of panels includes a set of panels having an originating panel and a cascaded panel whose respective subareas each include a shooting star or a segment of a shooting star, each set panel further comprising a sequential light source connected to the power source for sequentially inputting light into light pipes corresponding to said shooting star or shooting star segment.

19. The modular system according to claim 18 wherein the originating panel further comprises:

a controller that executes a pre-stored program, an output of the controller comprising M parallel digital data signals;

M accumulators each receiving a respective data signal from the controller, each accumulator accumulating an electrical charge whenever its respective data signal is true and discharging whenever its respective data signal is false; and M amplifiers each for sensing an electrical charge in its respective accumulator and energizing a respective LED according to the electrical charge, said respective LED illuminating a respective shooting star light pipe when energized;

the program causing the controller, from time to time, to sequentially pulse true each of the M data signals to give the effect of a fast traveling point of light;

the discharge time of the accumulators being suitably long to add a visually discernible tapering-off tail to the traveling point of light.

20. The modular system according to claim 19 wherein the controller outputs a shift clock, a latch signal and a serial data signal that is made true for a time by the program to continue a shooting star sequence in the cascaded panel, and wherein the cascaded panel further comprises:

an N-bit serial to parallel shift register responsive to the shift clock and operative to shift the true serial data signal through the register, one shift per shift clock;

an N-bit latch register having data inputs in respective communication with the parallel data outputs of the shift register, the latch register responsive to the latch signal and operative to store therein the state of its data inputs, a latch signal following in time each shift clock;

N accumulators each receiving a respective data output signal from the latch register, each accumulator accumulating an electrical charge whenever its respective data output signal is true and discharging whenever its respective data output signal is false; and N amplifiers each for sensing an electrical charge in its respective accumulator and energizing a respective LED according to the electrical charge, said respective LED illuminating a respective shooting star light pipe when energized;

the shifting and latching of the true serial data signal through the registers sequentially pulsing true the data output signals from the latch register to give the effect of a fast traveling point of light;

the discharge time of the accumulators being suitably long to add a visually discernible tapering-off tail to the traveling point of light.

21. The modular system according to claim 19 wherein the discharge time of the accumulators is suitably greater than the charge time of the accumulators for adding the visually discernible tapering-off tail to the traveling point of light that corresponds to the shooting star.

* * * * *